July 27, 1954   D. L. SMITH   2,684,727
GREASE TRAP
Filed July 3, 1953
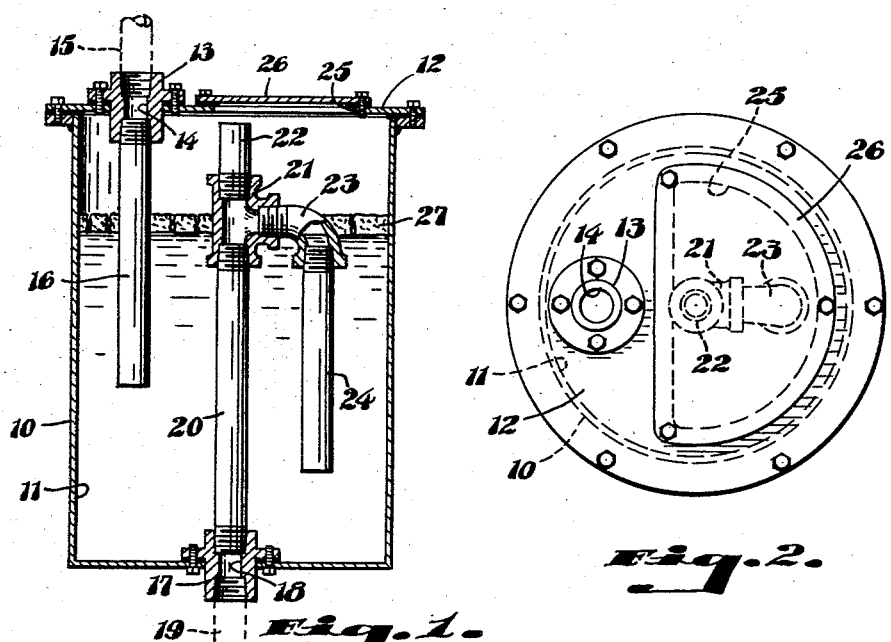
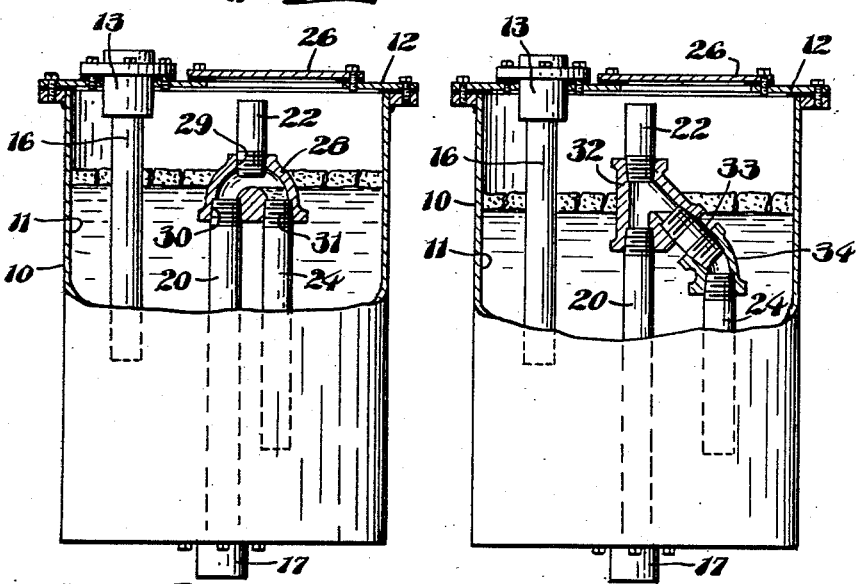
INVENTOR.
DANIEL L. SMITH,
BY: Harold B. Hood
ATTORNEY.

Patented July 27, 1954

2,684,727

UNITED STATES PATENT OFFICE 2,684,727

GREASE TRAP

Daniel L. Smith, Fort Myers, Fla., assignor of one-half to Ernest O. Hunt, Sebring, Fla.

Application July 3, 1953, Serial No. 365,991

5 Claims. (Cl. 182—9)

The present invention relates to improvements in grease traps of the unvented type used for the initial reception of the discharge from sinks of residences, and the like.

The primary object of the invention is to provide an extremely simple and inexpensive grease trap of the above-mentioned type, but one which, in spite of its simplicity, will perform its intended function in a highly efficient and satisfactory manner.

A further object is to provide, in such a device, a structure capable of being assembled from standard pipe fittings available on the open market, thereby greatly reducing the cost of manufacture.

A still further object is to provide a grease trap so constructed as to eliminate the need for elaborate baffles or a plurality of interconnected chambers, and to do so without sacrificing the efficiency of the device.

Another object is to provide such a device which can be easily cleaned and maintained without the necessity for dismantling the same.

Ancillary objects will become apparent as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a longitudinal sectional view through one form of grease trap embodying my invention;

Fig. 2 is a plan view of the trap of Fig. 1; and

Figs. 3 and 4 are sectional views similar to Fig. 1 but showing modified means for constructing my improved grease trap.

A device of the type here under consideration is intended for use primarily in conjunction with residential sewage systems of the type employing a septic tank in which it is extremely desirable, if not absolutely essential to the proper operation of such a tank, to remove the grease and fat wastes normally present in sink drainage, prior to the discharge of such drainage to the septic tank. The grease trap, according to conventional practice, is connected directly to the sink discharge line, with the discharge from the trap being connected to the septic tank.

With each flushing of the sink a certain amount of air is drawn along with the liquid, into the grease trap. Unless some means is provided for the elimination of this air from the trap, substantial pressure will accumulate in the trap resulting in the lowering of the liquid level therein below the discharge port, thereby completely destroying the intended function of the device. To provide for the elimination of this air, the trap must either be vented directly to the atmosphere, or some means must be provided for expelling the air through the discharge line leading from the trap. The latter method is the more economical of the two, since in the former, a stack through the roof of the dwelling must be provided. I have, therefore, designed my trap to operate according to the latter method.

Traps of this latter type, heretofore known and used, have been elaborate devices comprising a plurality of interconnected chambers formed by a series of baffle plates which have been considered, heretofore, as essential to the operation of such a device. I have found, however, that the need for such complicated structures is entirely eliminated if the trap is constructed according to my invention, now to be described in more detail.

Referring more particularly to the drawings, and especially to Figs. 1 and 2, it will be seen that I have illustrated my improved trap as comprising a body member 10, providing a chamber 11, said chamber being closed at the upper end thereof by a removable end-plate 12. In this end-plate, and near one side of chamber 11, I provide an inlet port defined by a fitting 13 having a passage 14 therethrough provided with threads in the opposite ends thereof. The discharge line 15 from a sink, or the like, is threadedly received in the outer end of passage 14.

Within chamber 11, a length of pipe 16, or other suitable conduit, has one end threadedly received in the inner end of passage 14 and from there extends downwardly toward the lower end of chamber 11 where it terminates short of said lower end.

Through the lower end of chamber 11, I provide a discharge port defined by a fitting 17, similar to fitting 13, having a threaded passage 18 therethrough. In the outer end of passage 18 is received the discharge line 19 for conducting the liquids from the trap to the sewage system.

Within chamber 11, a length of pipe 20, or other suitable conduit, has one end threadedly received in the inner end of passage 18 and from there extends upwardly toward the upper end of chamber 11. A standard pipe T-fitting 21 is threadedly received on the upper end of pipe 20 and a short nipple 22 is threadedly received in the opposite opening in fitting 21 to constitute, in effect, a continuation of pipe 20. The upper end of nipple 22 is spaced slightly below the inner surface of plate 12. In the side opening of fitting 21 is received the threaded end of a standard 90° street-L pipe fitting 23, the tapped end of which is turned downward toward the lower end of chamber 11. Into the tapped end of fitting 23 is threadedly received one end of a further pipe 24, or other suitable conduit, said pipe extending from fitting 23 downward toward the lower end of chamber 11.

It is particularly to be noted that the diameter of nipple 22 is preferably the same or greater than the diameter of pipes 20 and 24, for a purpose soon to become apparent.

Preferably, but not necessarily, a clean-out aperture 25 is provided in end-plate 12 in registry with the upper end of nipple 22. A closure 26 is removably secured over this aperture. While the entire end-plate 12 can be removed for the cleaning of the trap, I have found it more convenient to provide the removable closure 26.

Because of the comparative diameters of the pipes 20 and 24, and the nipple 22, a tool may be inserted through the nipple 22 and into both pipes 20 and 24 for the purpose of cleaning the same. No clean-out plugs are, therefore, necessary for access to these pipes.

Liquid entering the trap through passage 14 will be conducted through pipe 16 below the liquid level in chamber 11 before it is discharged into said chamber. The air accompanying the liquid will rise above the liquid where it will then enter, through the open end of nipple 22, into the discharge pipe 18 along with liquid flowing upwardly through pipe 24, fitting 23, fitting 21, to pipe 20. Any grease or fat wastes in the water will float to the surface of the liquid, as shown at 27, and be prevented from entering the discharge line 19 by the provision of the pipe 24 having its end spaced somewhat below the liquid level in chamber 11.

In Fig. 3 I have shown, in place of fittings 21 and 23, a single fitting 28 constituting a reverse pipe-bend having a tapered aperture 29 midway between the parallel openings 30 and 31 therein. The upper ends of pipes 20 and 24 are threadedly received in those parallel openings and the lower end of the nipple 22 is threadedly received in the aperture 29.

In Fig. 4 I have shown a still further manner of constructing my device in which I substitute a standard 45° Y-fitting 32 for the fitting 21 of Fig. 1, and a nipple 33 together with a 22½° pipe-bend 34, for the fitting 23.

While my invention is simple and relatively inexpensive to manufacture, it does a job heretofore thought performable only by elaborate and relatively expensive devices. Its operation is efficient, dependable and admirably comparable to that of such more elaborate devices. Its operation is efficient, dependable and admirably comparable to that of such more elaborate devices.

I claim as my invention:

1. A grease trap comprising a body having a chamber provided with an inlet port through the upper end thereof and a discharge port through the lower end thereof, there being disposed within said chamber a conduit extending from said inlet port downwardly therefrom but terminating short of the lower end of said chamber, another conduit extending from said discharge port upwardly therefrom, a three-way-passage fitting spaced slightly downward from the upper end of said chamber, the upper end of said other conduit being received in one passage of said fitting, a further conduit having one end received in another passage of said fitting and extending therefrom downwardly toward the lower end of said chamber, and a relatively short nipple having one end received in the third passage in said fitting and extending upwardly therefrom to a point just short of the upper end of said chamber.

2. The device of claim 1 in which said body is further provided with a relatively large aperture opening through the upper end of said chamber in registry with the upper end of said nipple, and including a closure for said aperture removably fixed to close the same.

3. The device of claim 2 in which the diameter of said nipple is equal to or larger than the diameter of said other and said further conduits.

4. The device of claim 3 in which said other conduit and said nipple are substantially coaxial.

5. The device of claim 3 in which said nipple and said further conduits are substantially parallel, the axis of said nipple being substantially equi-distantly spaced from the axes of said other and said further conduits.

References Cited in the file of this patent

UNITED STATES PATENTS

| Number | Name | Date |
|---|---|---|
| 1,071,889 | Dehn | Sept. 2, 1913 |
| 1,121,270 | McDermott | Dec. 15, 1914 |
| 2,284,737 | Hirschstein | June 2, 1942 |
| 2,453,219 | Grum | Nov. 9, 1948 |
| 2,564,172 | Raaberg et al. | Aug. 14, 1951 |